(12) United States Patent
Noguchi et al.

(10) Patent No.: US 11,288,158 B2
(45) Date of Patent: Mar. 29, 2022

(54) DEVICE IDENTIFICATION DEVICE AND DEVICE IDENTIFICATION METHOD

(71) Applicant: Nippon Telegraph and Telephone Corporation, Tokyo (JP)

(72) Inventors: Hirofumi Noguchi, Tokyo (JP); Yoji Yamato, Tokyo (JP); Misao Kataoka, Tokyo (JP); Tatsuya Demizu, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/973,137

(22) PCT Filed: Apr. 23, 2019

(86) PCT No.: PCT/JP2019/017140
§ 371 (c)(1),
(2) Date: Dec. 8, 2020

(87) PCT Pub. No.: WO2019/235090
PCT Pub. Date: Dec. 12, 2019

(65) Prior Publication Data
US 2021/0255943 A1    Aug. 19, 2021

(30) Foreign Application Priority Data

Jun. 8, 2018    (JP) .............................. JP2018-110116

(51) Int. Cl.
*G06F 15/16*    (2006.01)
*G06F 9/54*    (2006.01)
(Continued)

(52) U.S. Cl.
CPC .......... *G06F 11/3051* (2013.01); *G06F 17/15* (2013.01); *H04L 41/0869* (2013.01)

(58) Field of Classification Search
CPC ............. H04L 63/0876; H04L 63/0869; G06F 11/3051
(Continued)

(56) References Cited

U.S. PATENT DOCUMENTS 9,558,053 B1 *   1/2017  McClintock ........ G06F 11/3003
9,699,529 B1 *   7/2017  Petri ........................ H04Q 9/00
(Continued)

FOREIGN PATENT DOCUMENTS

JP    2011-059873    3/2011
JP    2018-505477    2/2018

OTHER PUBLICATIONS

Ohhashi et al., "Context Information Sharing Method in Wireless Sensor Network," Proceedings of the 72nd National Convention of IPSJ (3): Network Security, Mar. 8, 2020, pp. 477-478, 4 pages (with English Abstract).

(Continued)

*Primary Examiner* — Hamza N Algibhah
(74) *Attorney, Agent, or Firm* — Fish & Richardson P.C.

(57) ABSTRACT

A device identification device (100) includes: a device feature value extractor (1-1, 1-2) to routinely extract one or more device feature values of an unknown device; a model identifier (6) to identify a model of the unknown device; a change pattern generator (2) to generate one or more change patterns of the extracted one or more device feature values; and a device similarity calculator (3) to compare each of the generated one or more change patterns with each of change patterns of known devices, to calculate a device similarity therebetween, and identify the unknown device, when the maximum value of the calculated device similarities is equal to or greater than a first threshold, as the known device indicating the maximum value.

5 Claims, 3 Drawing Sheets

(51) Int. Cl.
*H04L 29/06* (2006.01)
*G06F 11/30* (2006.01)
*G06F 17/15* (2006.01)
*H04L 41/0869* (2022.01)

(58) Field of Classification Search
USPC .......................................................... 709/245
See application file for complete search history.

(56) References Cited

U.S. PATENT DOCUMENTS

| | | | | |
|---|---|---|---|---|
| 10,862,885 | B2 * | 12/2020 | Zhang | H04L 63/102 |
| 2008/0154387 | A1 * | 6/2008 | Nambu | H01R 13/639 |
| | | | | 700/3 |
| 2013/0281062 | A1 * | 10/2013 | Croy | H04N 21/25866 |
| | | | | 455/411 |
| 2014/0164418 | A1 * | 6/2014 | Etchegoyen | G06F 16/24 |
| | | | | 707/758 |
| 2014/0181892 | A1 * | 6/2014 | Von Bokern | H04L 63/0876 |
| | | | | 726/1 |
| 2014/0181893 | A1 * | 6/2014 | Von Bokern | H04L 9/3234 |
| | | | | 726/1 |
| 2015/0356451 | A1 * | 12/2015 | Gupta | G06F 21/552 |
| | | | | 706/52 |
| 2015/0378860 | A1 * | 12/2015 | Zhang | H04N 7/0255 |
| | | | | 710/16 |
| 2016/0164866 | A1 * | 6/2016 | Oberheide | H04L 63/0876 |
| | | | | 726/1 |
| 2016/0197999 | A1 | 7/2016 | Chun et al. | |
| 2017/0048708 | A1 * | 2/2017 | Ulrich | H04L 63/0876 |
| 2017/0302669 | A1 * | 10/2017 | Chen | H04L 63/08 |
| 2018/0012080 | A1 * | 1/2018 | Glaser | G06K 9/00771 |
| 2018/0270229 | A1 * | 9/2018 | Zhang | H04W 12/06 |
| 2018/0331915 | A1 * | 11/2018 | Cave | H04L 67/18 |
| 2019/0182790 | A1 * | 6/2019 | Kothari | G06T 7/20 |
| 2019/0288852 | A1 * | 9/2019 | Shetye | G06N 7/005 |

OTHER PUBLICATIONS

Simon et al., "The EAP-TLS Authentication Protocol," Network Working Group, Mar. 2008, 34 pages.

* cited by examiner

| Device feature value | Time received | | | | | | | |
|---|---|---|---|---|---|---|---|---|
| | 09:00:02 | 09:00:05 | 09:00:09 | 09:00:15 | 09:00:21 | ... | 09:00:56 | 09:00:58 |
| Param1 | Dev-A | Dev-A | Dev-A | Dev-A | Dev-A | ... | Dev-A | Dev-A |
| Param2 | 1 | 3 | 3 | 5 | 1 | ... | 1 | 3 |
| Param3 | hoge | hoge | fuga | fuga | hoge | ... | hoge | fuga |

| Device ID | Device type | Device model | Device name | Device feature value | Change pattern |
|---|---|---|---|---|---|
| 001 | Camera | XXX | Device A | Param1 | Pattern A |
| | | | | Param2 | Pattern B |
| | | | | Param3 | Pattern C |
| 002 | Camera | YYY | Device B | Param1 | Pattern D |
| | | | | Param2 | Pattern E |
| | | | | Param3 | Pattern F |
| 003 | Camera | Unknown | Device C | Param1 | Pattern G |
| 004 | Speaker | ZZZ | Device D | Param1 | Pattern H |
| 005 | Speaker | Unknown | Device E | Param1 | Pattern I |
| 006 | Speaker | Unknown | Device F | Param1 | Pattern J |
| 007 | Unknown | Unknown | Device G | Param1 | Pattern K |
| ... | ... | ... | ... | ... | ... |

| Device ID | State | |
|---|---|---|
| 001 | Access point | AP1 |
| | Software | SW1 |
| | Online state | Online |
| 002 | Access point | AP2 |
| | Software | SW2 |
| | Online state | Offline |
| 003 | Access point | AP2 |
| | Software | SW2 |
| | Online state | Online |
| ... | ... | ... |

FIG. 5

DEVICE IDENTIFICATION DEVICE AND DEVICE IDENTIFICATION METHOD

CROSS-REFERENCE TO RELATED APPLICATIONS

This application is a National Stage application under 35 U.S.C. § 371 of International Application No. PCT/JP2019/017140, having an International Filing Date of Apr. 23, 2019, which claims priority to Japanese Application Serial No. 2018-110116, filed on Jun. 8, 2018. The disclosure of the prior application is considered part of the disclosure of this application, and is incorporated in its entirety into this application.

TECHNICAL FIELD

The present invention relates to a device identification device and a device identification method.

BACKGROUND ART

The Internet of Things (IoT) has been expanding rapidly, and a huge variety of devices (IoT devices) have been connected to networks. It is predicted that 50 billion devices will be connected to the Internet in 2020, so that more and more devices will be installed in various environments such as at home, at plants, and on the streets. Devices connected to the networks include, but are not limited to, sensors such as cameras and thermometers, small computers such as smartphones, and actuators such as speakers and displays. Accordingly, there are wide variations in calculation processing capabilities of devices and protocols used for devices. The administrator of devices in each environment is required to accurately be aware of the natures and states of the devices and manage them so that such wide variations and huge number of devices are used suitably and safely.

Considering the operation of the IoT, the number of managed devices installed in the environment, their installation locations (positions), the connection status to the network, and versions of the installed software pieces change dynamically. Regarding the position, for example, in a home environment, moving an electric appliance will change the installation location of the sensor mounted therein. In a plant, when a manufacturing line is refurbished, a sensor may be moved to another manufacturing line for reuse to cause a change of the installation location thereof. In addition, a laptop computer, a webcam, or the like has its installation location naturally changed according to the movement of the user. At this time, if the change in the installation location such as a room or an area fails to be detected, the device would go missing from management point of view.

In addition, considering the network, a device having multiple access interfaces, such as a smartphone, may experience a network change from Wi-Fi (registered trademark) to a mobile line such as LTE (Long Term Evolution). At this time, if the device cannot be recognized as the same one even with a change in the network information of the device, such as an IP address, the device would also go missing in the network. Conventionally, it was sufficient to have the MAC address to specifically identify a device connected to the network, but a recent OS has been designed to randomly generate a MAC address every time it connects to the network, in consideration of security. As a result, a MAC address can no longer be used as a consistent key.

Also, considering software pieces that run on IoT devices, firmware and OS updates may sometimes be executed. At this time, if the devices after the software update fails to be recognized as the same one before the update, the device would go missing, as in the case of the network.

As described above, it is difficult to guarantee the identity of devices in IoT operation. Thus, when an installation location of a device, a network, or software is changed, if there is no capability of tracking to know what kind of change has been made for which device, there is a risk of failing to manage assets of devices installed in the past in terms of the current locations in the physical space and the network.

In addition, from the viewpoint of security, it is required to be capable of consistently following a specific device whose states change dynamically. For example, when a failure is detected in a device regardless of a change in the position or software of the device, it is necessary to work on the failure, such as identifying behaviors before the detection and the scope of influence. However, if there is a change in the location or software of a device in the IoT, where it is difficult to guarantee the identity of devices, no capability of tracking the status log of the device from past to present, for example, might inhibit working on the failure. Further, also from the viewpoint of device authentication, when the status of a device that has been authenticated once changes within a range of not violating the authentication policy, it is necessary to recognize the identity before and after the change in order to determine safety without re-authentication. However, the device might be forced to have re-authentication in the IoT, where it is difficult to guarantee the identity of devices, due to a change in state.

As described above, managing a huge number of IoT devices involves following the states of a wide variety of devices with different features and protocols, and identifying a specific device for management even if the state of the device changes, without confusing with other devices and newly installed devices. It is not realistic to manage such a huge number of IoT devices manually, and a technique is required for executing such management automatically.

An example of conventional techniques for identifying a specific device is International Mobile Equipment Identity (IMEI) which is assigned to mobile phones and some satellite phones. The IMEI may be used to uniquely identify a device connected to the network. However, a method of using a device specific identifier, including the IMEI, assumes using dedicated hardware in which the identifier is embedded, to have limitation in terms of applicable devices.

Another example of the conventional techniques for identifying a specific device is a method of issuing a computer certificate by EAP-TLS (Extensible Authentication Protocol—Transport Layer Security) (see Non-Patent Literature 1). According to this method, a computer certificate is issued for each device and installed in the device so as to be specifically identified. However, the method assumes that the device can handle the EAP-TLS protocol, so that it may be applicable to devices with ample computing power such as personal computers but cannot be applied to devices with limited computing power which are often the cases with IoT devices. That is, the method has limitation in terms of applicable devices, as in the case of IMEI.

CITATION LIST

Non-Patent Literature

Non-Patent Literature 1: D Simon et al., "The EAP-TLS Authentication Protocol," RFC5216, 2008. 3 [online],

[searched on May 31, 2018], the Internet <URL: https://www.rfc-editor.org/rfc/rfc5216.txt>.

SUMMARY OF THE INVENTION

Technical Problem

Even with above situations, continued operation of managing IoT devices would inevitably face increasing amount of management data, with the expansion of the IoT. Therefore, there is a further problem that the processing load for identifying an IoT device increases.

In view of such a background, the present invention is intended to suppress an increase in processing load for identifying a device connected to a network.

Solution to Problem

In order to solve the above-mentioned problems, the invention as claimed in claim 1 provides a device identification device for identifying an unknown device connected to a network, including: a device feature value extractor to routinely extract one or more device feature values of the unknown device from a signal received from the unknown device; a model identifier to identify a model of the unknown device from the signal received from the unknown device; a change pattern generator to generate one or more change patterns of the extracted one or more device feature values; and a device similarity calculator to compare each of the generated one or more change patterns to each of change patterns of known devices, belonging to the identified model, among a plurality of kinds of known devices stored in a storage unit of the device identification device, to calculate a device similarity between the unknown device and each of the known devices, belonging to the identified model, and identify the unknown device, when the maximum value of the calculated device similarities is equal to or greater than a first threshold, as the known device indicating the maximum value.

The invention as claimed in claim 3 provides a device identification method executed in a device identification device for identifying an unknown device connected to a network, including: routinely extracting one or more device feature values of an unknown device from a signal received from the unknown device; identifying a model of the unknown device from the signal received from the unknown device; generating one or more change patterns of the extracted one or more device feature values; comparing each of the generated one or more change patterns to each of change patterns of known devices, belonging to the identified model, among a plurality of kinds of known devices stored in a storage unit of the device identification device, to calculate a device similarity between the unknown device and each of the known devices, belonging to the identified model; and identifying the unknown device, when the maximum value of the calculated device similarities is equal to or greater than a first threshold, as the known device indicating the maximum value.

According to the inventions as claimed in claims 1 and 3, the model of the unknown device is preliminarily identified, to narrow down the known devices to be compared to the unknown device in terms of a change pattern for limiting the scope of calculating device similarities. Accordingly, an increase in processing load of identifying a device connected to the network is suppressed.

Further, the invention as claimed in claim 2 is the device identification device of the first aspect thereof, further including: a type similarity calculator to calculate a type similarity for every device type, when the model identifier has failed to identify the model of the unknown device, with respect to the one or more change patterns of the unknown device, and determine, when the maximum value of the calculated type similarities is equal to or greater than a second threshold, that a type of the unknown device is the type indicating the maximum value.

Similarly, the invention as claimed in claim 4 is the device identification method of the third aspect thereof executed in the device identification device, further including: calculating a type similarity for every device type, when identifying the model of the unknown device has been failed, with respect to the one or more change patterns of the unknown device; and determining, when the maximum value of the calculated type similarities is equal to or greater than a second threshold, that a type of the unknown device is the type indicating the maximum value.

According to the invention as claimed in claims 2 and 4, at least a type of the unknown device is determined even if a model of the unknown device has not been identified, to allow for storing the one or more change patterns of the unknown device in a database. Accordingly, the database of change patterns is expanded to improve accuracy of determining a type of a device at times of subsequent device identification.

Advantageous Effects of the Invention

According to the present invention, an increase in processing load of identifying a device connected to a network is suppressed.

DESCRIPTION OF EMBODIMENTS

<Overview>

Hereinafter, an embodiment of the present invention is described with reference to the drawings. The present invention is characterized by extracting one or more device feature values from a signal transmitted by a device such as a sensor to identify a specific device based on one or more change patterns of the extracted one or more device feature values. The one or more change patterns of the device feature values indicate characteristics of each kind of device, such as a size of transmission data, and intrinsic factors depending on a usage environment, such as communication delay. This allows for using a change pattern as information for identifying a specific device.

In addition, identifying a specific device requires in nature to use data of change patterns of all the devices existing in the network from past to present. However, the amount of accumulated data becomes enormous in an environment where a large number of devices exist, or in an environment where accumulation has been continued for a long time, leading to enormous processing load for identifying a specific device. Then, the present invention classifies devices by type and model and hierarchically manages the accumulated data, to narrow down the accumulated data required for identifying a specific device for suppressing an increase in processing load.

<Configuration>

Figure 1:
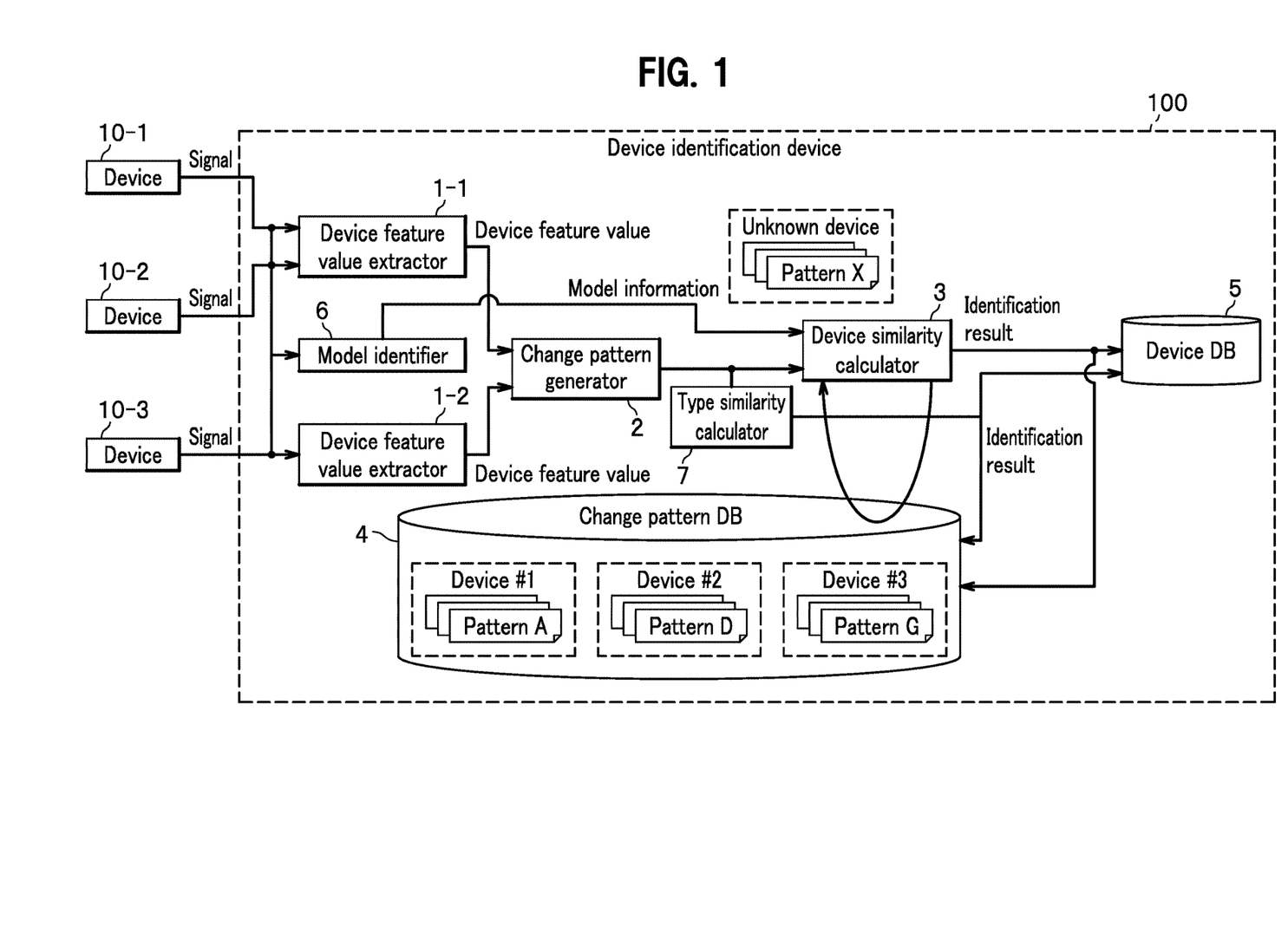
FIG. 1 is a functional block diagram of a device identification device according to a present embodiment.

A device identification device of the present embodiment is a device to identify a device connected to a network. As shown in FIG. 1, a device identification device 100 according to the present embodiment includes device feature value extractors 1-1 and 1-2, a change pattern generator 2, a device similarity calculator 3, a change pattern DB 4, a device DB 5, a model identifier 6, and a type similarity calculator 7. Reference numerals 10-1 to 10-3 in FIG. 1 denote devices (IoT devices) connected to the network, which are unknown devices to be identified by the device identification device 100. The change pattern DB 4 and the device DB 5 are databases stored in a storage unit of the device identification device 100.

The device feature value extractors 1-1 and 1-2 receive signals from the devices 10-1 to 10-3. The signals transmitted by the devices 10-1 to 10-3 are sensor values, alive-or-dead monitoring signals, and/or responses to requests, such as port scans, from the device identification device 100, for example.

The device feature value extractors 1-1 and 1-2 routinely extract device feature values of the devices 10-1 to 10-3 from the signals received from the devices 10-1 to 10-3. The device feature value can be mainly classified into information indicating states of the devices 10-1 to 10-3, and traffic characteristics. The information indicating states of the devices 10-1 to 10-3 is positions (installation locations) of the devices 10-1 to 10-3 and versions of software pieces executed by the devices 10-1 to 10-3, for example. The traffic characteristics are the average traffic volume within a predetermined time and the communication interval, for example.

Figure 2:
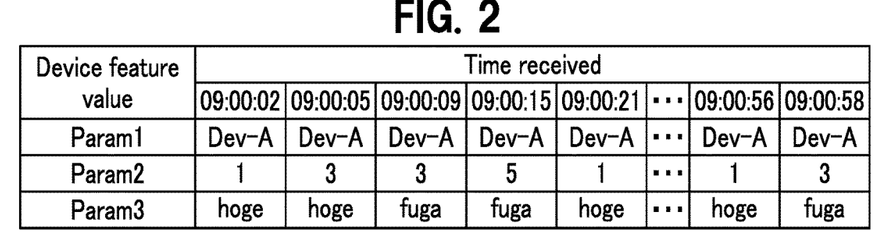
FIG. 2 shows a table of device feature values extracted routinely, as an example.

As described above, various kinds of data can be prepared as the device feature values, and the device feature values are values at the time of the device feature value extractors 1-1 and 1-2 receiving signals from the devices 10-1 to 10-3. FIG. 2 shows values of device feature values Param1, Param2, and Param3, having various values, at respective times received, as an example. Routinely extracting device feature values by the device feature value extractors 1-1 and 1-2 means obtaining device feature values at any time received over a predetermined period.

A communication protocol to be handled, a data acquisition method, and a device feature value extraction method differ depending on the type of IoT device, and thus the device feature value extractors 1-1 and 1-2 are preferably prepared for each protocol. In the example of FIG. 1, the communication protocol handled by the device feature value extractor 1-1 is the communication protocol used by the devices 10-1 and 10-2. The communication protocol handled by the device feature value extractor 1-2 is the communication protocol used by the device 10-3. The number of device feature value extractors 1-1 and 1-2 is not limited to 2, and may be 3 or more, or may be 1. Note that the number of devices 10-1 to 10-3 is not limited to 3 in the present embodiment, and may be 4 or more, or 2 or less.

The device feature value extractors 1-1 and 1-2 can be implemented as gateways in the local network environment. With such an implementation, the device feature value extractors 1-1 and 1-2 can also obtain low-layer information, such as a MAC frame, so as to be extracted as a device feature value.

The change pattern generator 2 generates a change pattern for each device with respect to the device feature values routinely extracted by the device feature value extractors 1-1 and 1-2. These change patterns are prepared for respective types of device feature values changing with time. The change pattern generator 2 has change pattern calculation logic embedded therein. Various kinds of logic are available as the calculation logic, depending on the characteristics of each device feature value, and is not limited to a specific one in the present embodiment. As an example, for a device feature value which may take different values with time, an approximate expression of time change represented by a linear function of the slope "a" and the intercept "b" can be used as the change pattern calculation logic. The change pattern generator 2 outputs the change pattern generated for each device feature value to the device similarity calculator 3, as a change pattern of an unknown device.

Figure 3:
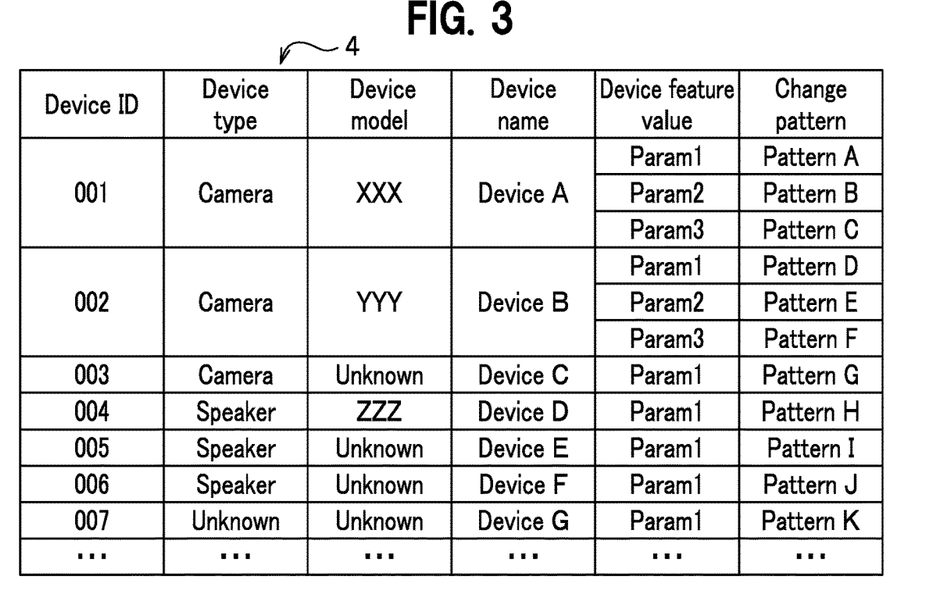
FIG. 3 shows an example of a data structure of a change pattern DB.

The device similarity calculator 3 compares the change pattern of the unknown device to the change patterns stored in the change pattern DB 4 to identify the unknown device. The change pattern DB 4 is a database to store change patterns collected in the past from known devices in the network environment. For example, as illustrated in FIG. 3, the change pattern DB 4 stores a device ID of a known device, a device type of the existing device, a device model of the existing device, a device name of the existing device, a device feature value of the known device, and a change pattern generated from the device feature value in association with one another.

The device type is a classification category to determine the type of a device, and is a category for a large classification corresponding to functions such as a camera, a speaker, a printer, a smartphone, and a personal computer. The device type may be simply referred to as the "type."

The device model is a classification category to determine a device standard, and is a category for distinguishing a group of the same device type by standard. The device model allows for a small classification of the devices. The device model may be simply referred to as the "model." For example, the model of the camera can be expressed as a "model number xx manufactured by Company A" to classify the cameras. The device name is the product name given to the device. The product name is given to each model. Accordingly, classification levels of device names are the same as those of device models. In the present embodiment, the product name is treated as an expression of the model.

If the value to be stored in the change pattern DB4 is unknown, it is left blank. For example, when the device type or device model is unknown, a value of "unknown" representing a blank is stored therefor, as in FIG. 3.

Returning to FIG. 1, the device similarity calculator 3 calculates the pattern similarity between the change pattern of the unknown device and the change pattern of the existing device for each device feature value of the unknown device. Various calculation formulas are available as a specific calculation formula of the pattern similarity, depending on the characteristics of each device feature value, and is not limited to a specific one in the present embodiment. As an example, when the above-described approximate expression of time change represented by the linear function of the slope "a" and the intercept "b" is obtained, the pattern similarity "si" for each device feature value is obtained using Equation 1 as follows.

$$si = 0.5 \times \Delta a + 0.5 \times \Delta b \quad \text{(Equation 1)},$$

where "si" is the pattern similarity for the i-th device feature value, "i" is a natural number from 1 to n, and "n" is the number of types of device feature values extracted from unknown devices. Δa is a value obtained by normalizing the absolute value of the difference between the slope obtained from the change pattern of the unknown device and the slope obtained from the change pattern of the known device for the i-th device feature value, so as to fall within the range of 0 to 1. Δb is a value obtained by normalizing the absolute value of the difference between the intercept obtained from the change pattern of the unknown device and the intercept obtained from the change pattern of the known device for the i-th device feature value, so as to fall within the range of 0 to 1.

According to Equation 1, "si" takes a value within the range of 0 to 1. The device similarity calculator 3 uses Equation 1 to calculate the pattern similarity for each kind of device feature value extracted from an unknown device, for each known device. Note that if the same kind of device feature value as the device feature value in connection with the change pattern of the unknown device is not extracted from the known device to have no corresponding change pattern, the pattern similarity for the device feature value may be assumed to be 0 for convenience.

The device similarity calculator 3 uses the calculated pattern similarity to calculate the device similarity between the unknown device and the known device. When calculating the device similarity, the device similarity calculator 3 may calculate a weight value for each pattern similarity, as described below.

Change in a device feature value used for identifying a device is better to be specific to have no other occurrences in multiple devices. For example, in an environment with many mobile terminals, a change pattern of a device position due to the device being moved is one of those repeatedly occurring in many devices and is a parameter which is not helpful for identifying a device (the way of a device being moved is random for each device, to have rare occurrences of a device-specific position change). Likewise, in an environment with software updates being simultaneously executed in a fixed cycle for a large number of devices of the same model, a change pattern of communication characteristics on downloading is not helpful for identifying a device.

In a case where the number of kinds of device feature values obtainable from devices is small, if changes in all device feature values are equally treated, many known devices having a high device similarity may be detected, to lower accuracy of identification. Then, in the present embodiment, variance of changes in the device feature values is evaluated for the change patterns stored in the change pattern DB 4. It is designed such that the greater the variance of the device feature value is, the greater the weight value for the device feature value is. This design allows for making such an arrangement that the more specific a change in a device feature value is, the more the device feature value contributes to calculating the device similarity.

For example, a weight value "ki" for each pattern similarity may be obtained with following Equation 2;

$$ki=vi/(\Sigma vi) \quad \text{(Equation 2)},$$

where "vi" is a value obtained by normalizing the variance value of the i-th device feature value so as to fall within the range of 0 to 1, "i" is a natural number from 1 to n, "n" is the number of kinds of device feature values extracted from unknown devices, and Σvi is the sum of n number of "vi"s. Here, "ki" is a weight value for the i-th device feature value.

According to Equation 2, the sum of weight values for all "n" number of kinds of device feature values is 1 (i.e., >Σi=1).

The device similarity calculator 3 obtains pattern similarities for all the change patterns stored in the change pattern DB 4, for every device feature value. Additionally, the device similarity calculator 3 uses Equation 2 to give weight values, based on the magnitude of the variance value, to the obtained pattern similarities.

The device similarity calculator 3 obtains the pattern similarity for every device feature value and then multiplies the pattern similarity by the weight value for synthesization, for example, to calculate device similarity between the unknown device and every known device. The device similarity S is calculated by Equation 3 as follows, for example;

$$S=\Sigma(ki*si) \quad \text{(Equation 3)}.$$

According to Equations 1 to 3, the device similarity S falls within the range of 0 to 1.

The device similarity calculator 3 selects the maximum value of the device similarities calculated by Equation 3, and when the maximum value is equal to or greater than a predetermined threshold (first threshold), the device to be identified, that is, the unknown device is identified to be the known device having the maximum value. If there is no device similarity equal to or greater than the predetermined threshold, the unknown device is determined as a new device connected to the network. The predetermined threshold may be set in advance by the system user, for example.

Figure 4:
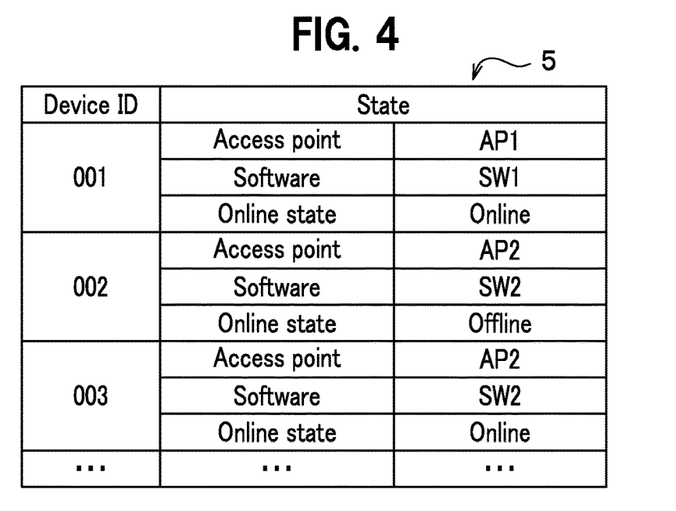
FIG. 4 shows an example of a data structure of a device DB.

The device similarity calculator 3 reflects the identification result for the unknown device in the device DB 5 and the change pattern DB 4, to update the device DB 5 and the change pattern DB 4. The device DB 5 is a database to manage the states of known devices identified by the device identification device 100. FIG. 4 shows association in the device DB 5 between the device ID of the known device and the value indicating the state thereof. As shown in FIG. 4, specific examples of states of the known device include an access point for network connection, installed software, and an online state. Specific example of another state of the known device includes an installation location of the known device (indicated by latitude and longitude, for example).

When the unknown device is found to be one of the known devices, the device similarity calculator 3 records the latest state of the unknown device in the device DB 5, as the identification result of the unknown device. When the unknown device is a new device, the device similarity calculator 3 adds device information indicating the state of the unknown device to the device DB 5, as the identification result of the unknown device. Here, the state of the unknown device to be recorded in the device DB 5 by the device identification device 100 may be information obtained in the identification process executed by the change pattern generator 2 and the device similarity calculator 3, or may be information obtained by accessing the device to be identified (former unknown device) after identification.

In addition, the device similarity calculator 3 registers the change pattern, which is generated by the change pattern generator 2 in the identification process of the unknown device, in the change pattern DB 4 as the identification result of the unknown device. When the unknown device is found to be one of the known devices, the device similarity calculator 3 replaces the change pattern of the corresponding known device in the change pattern DB 4 with the change pattern generated by the change pattern generator 2, to update the change pattern DB 4. If the unknown device is a new device, the device similarity calculator 3 adds the change pattern of the new device in the change pattern DB 4, to update the change pattern DB 4.

The model identifier 6 identifies the model of the unknown device from the signal received from the unknown device. Models of some devices may be identified from communication information (corresponding to signals). For example, a NIC (Network Interface Card) vendor may be identified from the first 24 bits of the MAC address, and an OS and an application program may be identified from information in the User-Agent header of an HTTP request, for combining various types of identified information to identify the product name. The model identifier 6 works with a database providing the association between the header and the product name (e.g., dictionary data or a market database), to identify a device model. The technique and database for identifying the product name from the header belong to known techniques, and detailed descriptions thereof are omitted.

For example, before the device similarity calculator 3 calculates the device similarity, the model identifier 6 may analyze the header information of the signal received from the unknown device, to identify the model of the unknown device. When the model identifier 6 has succeeded in identifying the model, the device similarity calculator 3 limits the data in the change pattern DB 4 to only data pertinent to the identified model, to calculate the device similarity.

Specifically, the model identifier 6 outputs model information indicating the identified model to the device similarity calculator 3. Next, the device similarity calculator 3 refers to the change pattern DB 4 using the model information as a key, to extract only the change patterns of the records pertinent to the model indicated by the model information for limiting the range of device similarity calculation. Lastly, the device similarity calculator 3 uses the change pattern generated by the change pattern generator 2 and the extracted change pattern to calculate the device similarity.

In contrary, when the model identifier 6 fails to analyze the header information and the like to identify the model of the unknown device, the device similarity calculator 3 calculates the device similarity for all the data in the change pattern DB 4. Specifically, the model identifier 6 sets the model of the unknown device to "unknown" and outputs the model information indicating the unknown model to the device similarity calculator 3. Next, the device similarity calculator 3 extracts all the change patterns stored in the change pattern DB 4, to calculate device similarity with the change pattern generated by the change pattern generator 2, without limiting the range of device similarity calculation.

The device similarity calculator 3 calculates the device similarity, and reflects the identification result of the unknown device, for which the identification has been completed, in the device DB 5 and the change pattern DB 4 to update the device DB 5 and the change pattern DB 4, as in the process already described. When the model identifier 6 has succeeded in identifying the model, the identified model is stored in the device model column of the change pattern DB 4. If the model identifier 6 has failed to identify the model, "unknown" is stored in the device model column of the change pattern DB 4.

The type similarity calculator 7 calculates a type similarity as a device similarity dedicated to determining the type of an unknown device. The type similarity is calculated for every device feature value of an unknown device, using the calculated pattern similarity between the change pattern of the unknown device and the change pattern of a type test device, which is specific to each type and is virtually provided, for example. Calculating the pattern similarity and calculating the device similarity as the type similarity come into line with those described above. For example, the change pattern of the type test device for each type may be stored in the change pattern DB 4.

Alternatively, the type similarity may be calculated for every device feature value of an unknown device, for each type, using the pattern similarity between the change pattern of the unknown device and the change patterns of all the known devices managed in the change pattern DB 4 as the same type, for example. In this case, a plurality of type similarities are calculated for the same type, but an optimum one of the calculated plurality of type similarities may be selected as the type similarity of said type, or the average value of the calculated plurality of type similarities may be the type similarity of said type, for example.

The type similarity calculator 7 calculates the type similarity for every type with respect to the change pattern of the unknown device generated by the change pattern generator 2. The type similarity calculator 7 selects the maximum value of the calculated type similarities for every type, and when the maximum value is equal to or greater than a predetermined threshold (type threshold or second threshold), the type of the unknown device is identified as the type of the type test device indicating the maximum value. The type threshold may be set in advance by the system user, for example.

The type similarity calculator 7 reflects the identification result including the type of the unknown device in the device DB 5 and the change pattern DB 4, to update the device DB 5 and the change pattern DB 4. Note that when there is no type similarity equal to or greater than the predetermined threshold, the type similarity calculator 7 determines that the type has not been identified, to determine the type of the unknown device as an unknown type. When the type has not been identified, "unknown" is stored in the device type column of the change pattern DB 4.

When the type of an unknown device is determined, at least one change pattern needs to be stored in the change pattern DB 4 for each device type. In the present embodiment, the way of initially constructing the change pattern DB 4 is not particularly limited, but a way of an administrator manually naming an unknown device, when the device is discovered, may be incorporated, for example, to implement subsequently determining a type of an unknown device without executing a particular data input process. As the number of devices to be identified increases, the amount of data in the change pattern DB 4 increases to contribute to improving accuracy of determining the device type. Note that identifying the type of the unknown device may be executed in parallel with identifying the unknown device, as described above.

Both the type and the model are categories for classifying devices, but in the present embodiment, the type is treated as a higher-level concept than the model. Accordingly, when the model identifier 6 has succeeded in identifying the model of an unknown device, the type of the unknown device is automatically identified. When the unknown device is a new device, both the model and type are stored in the change pattern DB 4, in association with the change pattern.

In contrast, when the model identifier 6 has failed to identify the model of the unknown device (hence failed to identify the type) but the type thereof has been identified through determination by the type similarity calculator 7, the type is stored in the change pattern DB 4, in association with the change pattern, and the model is stored therein as "unknown."

<Operation>

Figure 5:
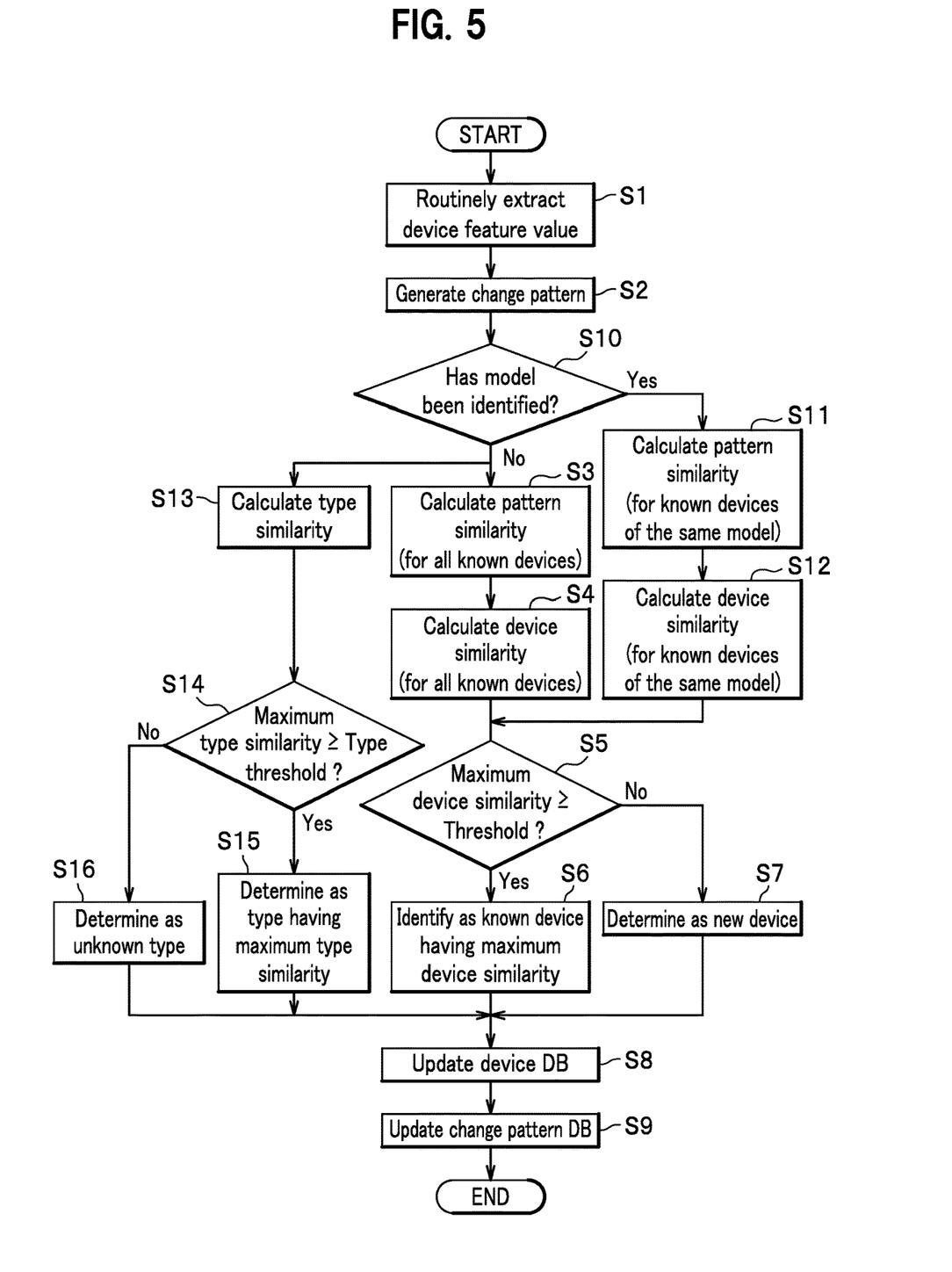
FIG. 5 shows a flowchart of a device identification process.

Next, a device identification process executed by the device identification device 100 is described. Here, a description is given of a case where the device feature value extractor 1-1 obtains a signal from an unknown device.

First, the device identification device 100 uses the device feature value extractor 1-1 to routinely extract the device feature value of the unknown device in the signal received from the unknown device (step S1). Next, the device identification device 100 uses the change pattern generator 2 to generate a change pattern of the device feature value extracted from the unknown device (step S2).

Next, the device identification device 100 uses the model identifier 6 to analyze the signal received from the unknown device to determine whether or not the model of the unknown device has been identified (step S10).

When having failed to identify the model of the unknown device (No in step S10), the device identification device 100 uses the device similarity calculator 3 to calculate a pattern similarity between the change pattern of the unknown device and the change pattern of every known device stored in the change pattern DB 4 (step S3). The calculation of the pattern similarity is executed for all known devices stored in the change pattern DB 4.

Next, the device similarity calculator 3 of the device identification device 100 uses the calculated pattern similarity to calculate a device similarity between the unknown device and every known device (step S4). The calculation of the device similarity is executed for all known devices stored in the change pattern DB 4. In step S4, the maximum value of the calculated device similarities and the known device having the maximum device similarity are identified.

Next, the device similarity calculator 3 of the device identification device 100 determines whether the calculated maximum device similarity is equal to or greater than a predetermined threshold (step S5). When the maximum device similarity is equal to or larger than the threshold (Yes in step S5), the device similarity calculator 3 of the device identification device 100 identifies the unknown device as the known device having the maximum device similarity (step S6). In contrary, when the maximum device similarity is not equal to or greater than the threshold (No in step S5), the device similarity calculator 3 of the device identification device 100 determines the unknown device as a new device connected to the network (step S7).

Next, the device similarity calculator 3 of the device identification device 100 registers the identification result of the known device having the maximum device similarity or the device to be identified (unknown device) determined to be a new device in the device DB 5, to update the device DB 5 (step S8). Next, the device similarity calculator 3 of the device identification device 100 registers the change pattern of the device to be identified in the change pattern DB 4, to update the change pattern DB 4 (step S9). After the update, the device identification process ends.

In contrast, when having succeeded in identifying the model of the unknown device (Yes in step S10), the device similarity calculator 3 of the device identification device 100 calculates a pattern similarity between the change pattern of the unknown devices and that of every known device stored in the change pattern DB 4 (step S11). The calculation of the pattern similarity is executed for those known devices of the same model as the identified model, among the known devices stored in the change pattern DB 4.

Next, the device similarity calculator 3 of the device identification device 100 uses the calculated pattern similarity to calculate the device similarity between the unknown device and every known devices (step S12). The calculation of the device similarity is executed for the known devices of the same model as the identified model, among the known devices stored in the change pattern DB 4. In step S12, the maximum value of the calculated device similarities and the known devices of the same model having the maximum device similarity are identified.

Then, the device identifying device 100 uses the identified known device to execute the above-described processing in steps S5 to S9 for the unknown device, and the device identification process ends.

When having failed to identify the model of the unknown device (No in step S10), the device identification device 100 uses the type similarity calculator 7 to calculate a type similarity for every type, with respect to the change pattern of the unknown device (step S13), in parallel with processing in step S3. In step S13, the maximum value of the type similarities calculated for all types is identified.

Next, the type similarity calculator 7 of the device identification device 100 determines whether or not the maximum value of the calculated type similarity is equal to or greater than a predetermined type threshold (step S14). When it is equal to or greater than the type threshold (Yes in step S14), the type similarity calculator 7 of the device identification device 100 determines the type of the unknown device as the type having the maximum type similarity (step S15). In contrary, when it is not equal to or greater than the type threshold (No in step S14), the type similarity calculator 7 of the device identification device 100 determines the type of the unknown device as an unknown type (step S16).

Then, the device identification device 100 updates the device DB 5 (step S8) and the change pattern DB 4 (step S9), as already described above, for the unknown device whose type has been determined specifically or as being unknown, and the device identification process ends.

The present embodiment uses a change pattern of a device feature value, specifically resulting in every device, to identify the device. That is, the device feature value itself is not used to identify the device, to allow for executing the device identification process regardless of the characteristics of every device feature value of devices. In addition, although there are various kinds of device feature values, the present embodiment focuses on the change pattern of the device feature value, to allow for executing the device identification process regardless of the kind of the device feature value. Accordingly, any device connected to the network can be identified.

It should be noted that the present embodiment requires no dedicated hardware for IMEI support or the like as in the prior art, and is implemented with only software functions as described above. In addition, the present embodiment is free from requiring a device to be capable of handling a special protocol such as the EAP-TLS protocol for the prior art, to have no particular limitation in applicable devices.

Further, the pattern similarity may be weighted for each device feature value, to make such an adjustment that the more specific a change in a device feature value is, the more the device feature value contributes to calculating the device similarity. This improves accuracy of device identification.

Furthermore, the change pattern generated by the change pattern generator 2 is used to update the change pattern of the corresponding known device in the change pattern DB 4, to make the change pattern of the known device always the latest. This allows for using the latest change pattern for subsequent identification of an unknown device, to avoid an error in identifying a device caused by using an old change pattern.

Moreover, the present embodiment identifies the model of the unknown device in advance, to narrow down the known devices to be compared to the unknown device in terms of the change pattern, for limiting the range of calculating the device similarity. This allows for suppressing an increase in the processing load of identifying a device connected to the network.

Still moreover, even when the model of the unknown device fails to be identified, at least the type of the unknown device is determined to store the change pattern of the unknown device in the database. As a result, the database of change patterns is expanded to improve accuracy of determining the device type in the subsequent device identification.

<Modifications>

Hereinabove, the embodiment of the present invention has been described, but the present invention is not limited to the above-described embodiment and may be suitably modified without departing from the scope of the present invention, as follows:

a) in calculating the pattern similarity "si" for every device feature value extracted from an unknown device, as an example, the approximate expression of the temporal change may be expressed by an n-th order function ("n" is a natural number of 2 or more), for example, instead of being expressed by a linear function as in Equation 1; and b) in calculating the device similarity S, as another example, the infinite product of the weighted pattern similarities may be calculated, for example, instead of calculating the sum of the weighted pattern similarities as in Equation 3.

In addition, in the processes described in the above-described embodiment, all or parts of the processes described as being automatically executed may be manually executed, or all or parts of the processes described as being manually executed may be automatically executed with a known technique. Additionally, the processing procedures, control procedures, specific names, and information including various data and parameters in the above description and drawings may be arbitrarily modified unless otherwise specified. Further, the components of the devices are illustrated based on a functional concept, and are not necessarily required to be physically configured as illustrated. That is, specific embodiments of separation and integration of the devices are not limited to those illustrated in the drawings, and all or parts of the devices may be functionally or physically separated and integrated in any number of units, depending on various kinds of loads and usage conditions.

Further, the configurations, functions, processors, processing means, and the like, as described above, may be implemented by hardware, with parts or all of them designed as an integrated circuit, for example. Alternatively, the configurations, functions, and the like, as described above, may be implemented by software, with a processor interpreting and executing programs to implement respective functions. Information such as programs to implement respective functions, tables, and files may be stored in a recording device, such as a memory, a hard disk, and an SSD (Solid State Drive), or a recording medium, such as an IC (Integrated Circuit) card, an SD (Secure Digital) card, and an optical disc. Furthermore, a processing step in the present specification to describe chronological processing includes not only processing to be executed chronologically in the described sequence, but also processing to be executed in parallel or independently (e.g., parallel processing or object-based processing), which may not be executed chronologically.

Moreover, the various techniques described in the present embodiment may be suitably combined to implement the present invention. The software described in the present embodiment may be implemented as hardware, or the hardware may be implemented as software. Additionally, the hardware, the software, the flowchart, and the like may be suitably modified within the scope of the present invention.

LEGEND FOR REFERENCE NUMERALS

100: device identification device, 1-1, 1-2: device feature value extractor, 2: change pattern generator, 3: device similarity calculator, 4: change pattern DB, 5: device DB, 6: model identifier, 7: type similarity calculator, and 10-1 to 10-3: devices.

The invention claimed is:

1. A device identification device for identifying an unknown device connected to a network, comprising:
    a device feature value extractor, including one or more processors, configured to routinely extract one or more device feature values of the unknown device from a signal received from the unknown device;
    a model identifier, including one or more processors, configured to identify a model of the unknown device from the signal received from the unknown device;
    a change pattern generator, including one or more processors, configured to generate one or more change patterns of the extracted one or more device feature values, wherein the change patterns are prepared, using one or more predetermined calculation logics, for respective types of the one or more device feature values changing with time; and
    a device similarity calculator, including one or more processors, configured to compare each of the generated one or more change patterns to each of change patterns of known devices, belonging to the identified model, among a plurality of kinds of known devices stored in a storage unit of the device identification device, to calculate a device similarity between the unknown device and each of the known devices, belonging to the identified model, and identify the unknown device, when a maximum value of the calculated device similarities is equal to or greater than a first threshold, as the known device indicating the maximum value of the calculated device similarities.

2. The device identification device as claimed in claim 1, further comprising:
    a type similarity calculator, including one or more processors, configured to calculate a type similarity for every device type, when the model identifier has failed to identify the model of the unknown device, with respect to the one or more change patterns of the unknown device, and determine, when a maximum value of the calculated type similarities is equal to or greater than a second threshold, that a type of the unknown device is the type indicating the maximum value of the calculated type similarities.

3. A device identification method executed in a device identification device for identifying an unknown device connected to a network, comprising:
    routinely extracting one or more device feature values of the unknown device from a signal received from the unknown device;

identifying a model of the unknown device from the signal received from the unknown device;

generating one or more change patterns of the extracted one or more device feature values, wherein the change patterns are prepared, using one or more predetermined calculation logics, for respective types of the one or more device feature values changing with time;

comparing each of the generated one or more change patterns to each of change patterns of known devices, belonging to the identified model, among a plurality of kinds of known devices stored in a storage unit of the device identification device, to calculate a device similarity between the unknown device and each of the known devices, belonging to the identified model; and identifying the unknown device, when a maximum value of the calculated device similarities is equal to or greater than a first threshold, as the known device indicating the maximum value of the calculated device similarities.

4. The device identification method executed in the device identification device as claimed in claim 3, further including:

calculating a type similarity for every device type, when identifying the model of the unknown device has been failed, with respect to the one or more change patterns of the unknown device; and determining, when a maximum value of the calculated type similarities is equal to or greater than a second threshold, that a type of the unknown device is the type indicating the maximum value of the calculated type similarities.

5. A device identification device for identifying an unknown device connected to a network, comprising:

one or more processors for executing computer-readable code, the computer-readable code causing the one or more processors to:

routinely extract one or more device feature values of the unknown device from a signal received from the unknown device;

identify a model of the unknown device from the signal received from the unknown device;

generate one or more change patterns of the extracted one or more device feature values, wherein the change patterns are prepared, using one or more predetermined calculation logics, for respective types of the one or more device feature values changing with time; and compare each of the generated one or more change patterns to each of change patterns of known devices, belonging to the identified model, among a plurality of kinds of known devices stored in a storage unit of the device identification device, to calculate a device similarity between the unknown device and each of the known devices, belonging to the identified model, and identify the unknown device, when a maximum value of the calculated device similarities is equal to or greater than a first threshold, as the known device indicating the maximum value of the calculated device similarities.

* * * * *